(12) United States Patent
Towler

(10) Patent No.: US 7,932,204 B2
(45) Date of Patent: Apr. 26, 2011

(54) METHOD OF REGENERATING CATALYST IN A FLUIDIZED CATALYTIC CRACKING UNIT

(75) Inventor: Gavin P. Towler, Inverness, IL (US)

(73) Assignees: UOP LLC, Des Plaines, IL (US); BP Corporation North America Inc., Warrenville, IL (US)

( * ) Notice: Subject to any disclaimer, the term of this patent is extended or adjusted under 35 U.S.C. 154(b) by 745 days.

(21) Appl. No.: 11/963,006

(22) Filed: Dec. 21, 2007

(65) Prior Publication Data

US 2009/0163351 A1 Jun. 25, 2009

(51) Int. Cl.
*B01J 38/40* (2006.01)
(52) U.S. Cl. .................. 502/39; 502/38; 502/41
(58) Field of Classification Search .............. 502/38, 502/39, 41
See application file for complete search history.

(56) References Cited

U.S. PATENT DOCUMENTS

| | | | |
|---|---|---|---|
| 2,888,395 A | 5/1959 | Henny |
| 2,905,622 A | 9/1959 | McCarthy |
| 3,012,962 A | 12/1961 | Dygert |
| 3,137,133 A | 6/1964 | Wilson et al. |
| 3,363,993 A | 1/1968 | Campbell |
| 3,401,124 A | 9/1968 | Goulden |
| 3,554,903 A | 1/1971 | Wilson |
| 3,726,791 A | 4/1973 | Kimberlin, Jr. et al. |
| 3,856,659 A | 12/1974 | Owen |
| 3,886,060 A | 5/1975 | Owen |
| 3,928,172 A | 12/1975 | Davis, Jr. et al. |
| 4,075,831 A | 2/1978 | McGann |
| 4,158,680 A | 6/1979 | McGann |
| 4,272,402 A | 6/1981 | Mayes |
| 4,276,150 A | 6/1981 | McHenry, Jr. |
| 4,309,309 A | 1/1982 | Blanton, Jr. |
| 4,316,794 A | 2/1982 | Schoennagel |
| 4,338,788 A | 7/1982 | Fink |
| 4,388,218 A | 6/1983 | Rowe |
| 4,399,651 A | 8/1983 | Geary, Jr. et al. |
| 4,422,925 A | 12/1983 | Williams et al. |
| 4,425,259 A | 1/1984 | Hettinger, Jr. et al. |
| 4,431,529 A | 2/1984 | Carson |
| 4,452,048 A | 6/1984 | Geary, Jr. et al. |
| 4,539,303 A | 9/1985 | Maclean et al. |
| 4,542,114 A | 9/1985 | Hegarty |
| 4,600,499 A | 7/1986 | Hettinger, Jr. |
| 4,744,883 A | 5/1988 | Hettinger, Jr. |
| 4,776,948 A | 10/1988 | Skraba |
| 4,888,103 A | 12/1989 | Herbst et al. |
| 4,927,348 A | 5/1990 | Avidan |
| 4,965,232 A | 10/1990 | Mauleon |
| 5,114,682 A | 5/1992 | Goelzer |
| 5,451,313 A | 9/1995 | Wegerer et al. |
| 5,538,623 A | 7/1996 | Johnson et al. |
| 5,597,537 A | 1/1997 | Wegerer et al. |
| 5,800,697 A | 9/1998 | Lengemann |
| 6,048,451 A | 4/2000 | Huff, Jr. et al. |
| 6,110,356 A | 8/2000 | Hedrick et al. |
| 6,324,895 B1 | 12/2001 | Chitnis et al. |
| 6,616,899 B1 | 9/2003 | Upson |
| 6,866,771 B2 | 3/2005 | Lomas et al. |
| 6,916,417 B2 | 7/2005 | Mayes, Jr. |
| 7,005,455 B2 | 2/2006 | Cnossen et al. |
| 2002/0120017 A1 | 8/2002 | Bohn et al. |
| 2004/0120878 A1 | 6/2004 | Mayes, Jr. |
| 2006/0021909 A1 | 2/2006 | Cerqueira |
| 2006/0116543 A1 | 6/2006 | Bellet et al. |
| 2009/0032439 A1 | 2/2009 | Couch et al. |
| 2009/0035191 A1 | 2/2009 | Couch et al. |
| 2009/0035193 A1 | 2/2009 | Zhu et al. |
| 2010/0137458 A1 | 6/2010 | Erling et al. |

FOREIGN PATENT DOCUMENTS

| | | |
|---|---|---|
| BE | 875 477 | 10/1979 |
| DE | 1 667 573 | 8/1967 |
| DE | 2021 787 | 11/1971 |
| DE | 36 35 269 A1 | 10/1985 |
| DE | 37 09 185 A1 | 3/1986 |
| EP | 0 083 462 | 7/1983 |
| EP | 0092065 | 10/1983 |
| EP | 0100531 | 2/1984 |
| EP | 0 113 380 A1 | 7/1984 |
| EP | 0162251 | 11/1985 |
| EP | 0 322 274 A1 | 6/1989 |
| EP | 0369537 | 5/1990 |
| EP | 0490453 | 6/1992 |
| EP | 0 629 685 A1 | 12/1994 |
| EP | 1 278 700 B1 | 1/2003 |
| EP | 1935966 | 6/2008 |
| EP | 1939269 | 7/2008 |

(Continued)

OTHER PUBLICATIONS

U.S. Appl. No. 11/643,497, filed Dec. 21, 2006, Towler et al.

(Continued)

*Primary Examiner* — Edward M Johnson
(74) *Attorney, Agent, or Firm* — Brinks Hofer Gilson & Lione

(57) ABSTRACT

Systems and methods of improving synthesis gas quality in a fluid catalytic cracking unit are disclosed. In one example, a method comprises reacting a first stage regeneration gas comprising oxygen with spent catalyst from a reactor in a first stage of a regenerator to consume the oxygen in the first stage regeneration gas. This reaction produces a synthesis gas output and partially regenerated catalyst. The method further comprises reacting a second stage regeneration gas comprising oxygen with the partially regenerated catalyst in a second stage of the regenerator to regenerate the partially regenerated catalyst. This reaction produces the first stage regeneration gas for reaction with the spent catalyst in the first stage of the regenerator. Through the first and second stage reactions, the spent catalyst is regenerated and the synthesis gas quality is improved.

13 Claims, 2 Drawing Sheets

FOREIGN PATENT DOCUMENTS

| | | |
|---|---|---|
| EP | 2022838 | 2/2009 |
| FR | 2596059 | 9/1987 |
| FR | 2 796 932 | 2/2001 |
| GB | 711208 | 6/1954 |
| GB | 2 024 033 A | 1/1980 |
| GB | 2107205 | 4/1983 |
| GB | 2 197 390 A | 5/1988 |
| GB | 2 263 314 A | 7/1993 |
| JP | 59-52529 | 3/1984 |
| JP | 5-17162 | 2/1987 |
| JP | 62-32181 | 2/1987 |
| JP | 62-56919 | 3/1987 |
| JP | 5-320863 | 12/1993 |
| JP | 6-256239 | 9/1994 |
| WO | WO 85/04181 | 9/1985 |
| WO | WO 90/06352 | 6/1990 |
| WO | WO 96/39369 | 12/1996 |
| WO | WO 98/46700 | 10/1998 |
| WO | WO 99/11739 | 3/1999 |
| WO | WO 01/70909 A1 | 9/2001 |
| WO | WO 01/77010 A1 | 10/2001 |
| WO | WO 02/04347 A1 | 1/2002 |
| WO | WO 02/051966 A1 | 7/2002 |
| WO | WO 03/035591 A1 | 5/2003 |
| WO | WO 03/062142 A1 | 7/2003 |

OTHER PUBLICATIONS

U.S. Appl. No. 11/643,554, filed Dec. 21, 2006, Hedrick et al.
U.S. Appl. No. 11/643,733, filed Dec. 21, 2006, McGehee.
U.S. Appl. No. 11/643,734, filed Dec. 21, 2006, Towler et al.
U.S. Appl. No. 11/962,740, filed Dec. 21, 2007, Hedrick.
U.S. Appl. No. 11/962,763, filed Dec. 21, 2007, Hedrick.
U.S. Appl. No. 11/962,810, filed Dec. 21, 2007, Hedrick.
U.S. Appl. No. 11/963,051, filed Dec. 21, 2007, Towler.
U.S. Appl. No. 11/963,101, filed Dec. 21, 2007, Hedrick.
J. Terrible, et al.; "Consider using hydrogen plants to cogenerate power needs"; Hydrocarbon Processing (International edition); vol. 78/No. 12; pp. 43-53; Dec. 1999.
D.W. Townsend, et al.; "Heat and Power Networks in Process Design—Criteria for Placement of Heat Engines and Heat Pumps in Process Networks"; AIChe Journal (vol. 29, No. 5); pp. 742-748; Sep. 1983.
D.L. Bonk, et al.: "An Evaluation of Gas Turbines for APFBC Power Plants"; Presented to the Powergen 2000 Conference.
D.L. Bonk, et al.; "First-Generation Circulating Pressurized Fluidized Bed (CPFB) Combustor Power System with Industrial Components"; U.S. Department of Energy (date unknown).
D.G. Tajbl: "UOP Fluid Catalytic Cracking Process"; Handbook of Petroleum Refining Process, R.A. Meyers, Ed.; New York: McGraw Hill 1986.
McCabe, W.L. et al. (1993) Unit Operations in Chemical Engineering, $5^{th}$ ed., McGraw-Hill, (5 pages).
"Implications of Using 'Torch Oil'" accessed online at <http://www.catcracking.com/operations/Torch_Oil.shtm> on Sep. 30, 2009. (No additional bibliographic information available).

METHOD OF REGENERATING CATALYST IN A FLUIDIZED CATALYTIC CRACKING UNIT

This application is the result of a joint research agreement between UOP, LLC and BP America, Inc.

BACKGROUND OF THE INVENTION

The present invention relates to systems and methods of reducing carbon dioxide emissions in a fluid catalytic cracking (FCC) unit.

The fluidized catalytic cracking of hydrocarbons is the mainstay process for the production of gasoline and light hydrocarbon products from heavy hydrocarbon charge stocks such as vacuum gas oils or residual feeds. Large hydrocarbon molecules associated with the heavy hydrocarbon feed are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator, and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes trapped hydrocarbons from the catalyst by counter-current contact with steam or another stripping medium.

The FCC process is carried out by contacting the starting material—generally vacuum gas oil, reduced crude, or another source of relatively high boiling hydrocarbons—with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. The cracking reaction deposits coke on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place.

Catalyst is traditionally transferred from the stripper to a regenerator for purposes of removing the coke by oxidation with an oxygen-containing gas. An inventory of catalyst having a reduced coke content relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas or synthesis gas depending on the choice of feed gas to the regenerator (i.e., air to the regenerator generates flue gas while an artificially created gas comprising oxygen and (1) steam, (2) carbon dioxide or (3) steam and carbon dioxide will generate synthesis gas). The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

Refining companies are under increased pressure to reduce $CO_2$ emissions as a result of carbon tax legislation and other drivers such as a desire to demonstrate long-term sustainability. Roughly 15-25% of refinery $CO_2$ emissions are caused by the burning of catalyst coke in the FCC regenerator. Thus, there is a need to provide a way to reduce the carbon dioxide emissions in a fluid catalytic cracking unit.

Carbon dioxide emissions in a FCC unit can be reduced by regenerating spent catalyst under gasification conditions. There are two competing problems that must be addressed when gasifying catalyst coke in a regenerator: (1) completing regeneration of the catalyst and (2) maximizing synthesis gas quality. To fully regenerate the spent catalyst, a high concentration of oxygen is required in relation to the coke on the catalyst. The problem is that excess oxygen will lead to combustion of the synthesis gas, lowering the quality of the synthesis gas product. Thus, there is a need to provide a solution in which catalyst is completely regenerated and the synthesis gas product is maximized.

BRIEF SUMMARY OF THE INVENTION

Embodiments of the present invention generally provide systems and methods of reducing carbon dioxide emissions in fluid catalytic cracking units having a reactor and a regenerator at gasification conditions. The systems and methods of the present invention provide solutions for regenerating spent catalyst while maximizing synthesis gas output.

In one example of the present invention, a method is provided for regenerating catalyst in a fluidized catalytic cracking unit having a reactor and a regenerator with first and second stages, and first and second stage regeneration gases. The method comprises a reaction between the first stage regeneration gas comprising oxygen and spent catalyst from the reactor in the first stage of the regenerator to consume the oxygen in the first stage regeneration gas. This reaction produces a synthesis gas and partially regenerated catalyst. The method further comprises a reaction between the second stage regeneration gas comprising oxygen and the partially regenerated catalyst in the second stage of the regenerator to regenerate the partially regenerated catalyst. This reaction produces the first stage regeneration gas for reaction with the spent catalyst in the first stage of the regenerator. Through the first and second stage reactions, the spent catalyst is regenerated and the synthesis gas quality is maximized.

In another example, an additional method is provided for regenerating catalyst in a fluidized catalytic cracking unit having a reactor and a regenerator with first and second stages, and first and second stage regeneration gases. The method comprises a reaction between the first stage regeneration gas comprising oxygen and spent catalyst from the reactor in the first stage of the regenerator to consume the oxygen in the first stage regeneration gas. The first stage regeneration gas passes counter-currently over the spent catalyst. The first stage reaction produces a synthesis gas and partially regenerated catalyst. The method further comprises a reaction between the second stage regeneration gas comprising oxygen and the partially regenerated catalyst in the second stage of the regenerator to regenerate the partially regenerated catalyst. The second stage regeneration gas passes counter-currently over the partially regenerated catalyst. The second stage reaction produces a regenerated catalyst and the first stage regeneration gas for reaction with the spent catalyst in the first stage of the regenerator. Through the first and second stage reactions, the spent catalyst is regenerated and the synthesis gas quality is maximized.

Additionally, another embodiment provides a system for regenerating spent catalyst in a fluidized catalytic cracking unit while improving the quality of a synthesis gas. The system comprises a reactor for catalytic cracking of hydrocarbon feedstocks and providing spent catalyst. The system further comprises a regenerator in fluid communication with the reactor. The regenerator comprises a first stage and a second stage in fluid communication with the first stage. The first stage is configured to react a first stage regeneration gas comprising oxygen with spent catalyst for consumption of the oxygen in the first stage regeneration gas. This reaction produces synthesis gas and partially regenerated catalyst. The second stage is configured to react a second stage regeneration gas comprising oxygen with the partially regenerated catalyst. The reaction regenerates the partially regenerated catalyst and forms the first stage regeneration gas for reaction with the spent catalyst in the first stage of the regenerator. The configuration of the two stage regenerator completes regeneration of a catalyst while maximizing the quality of the synthesis gas from the regenerator.

Further objects, features, and advantages of the present invention will become apparent from consideration of the following description and the appended claims when taken in connection with the accompanying drawings.

DETAILED DESCRIPTION OF THE INVENTION

Embodiments of the present invention generally provide systems and methods of reducing carbon dioxide emissions in a fluid catalytic cracking (FCC) unit having a reactor and a regenerator at gasification conditions. In one embodiment, this is accomplished by regenerating catalyst in a regenerator with first and second stages. In the first stage, a first stage regeneration gas comprising oxygen reacts with the spent catalyst from the reactor. The reaction consumes the oxygen in the gas and creates partially regenerated catalyst and synthesis gas. In the second stage, a second stage regeneration gas comprising oxygen reacts with the partially regenerated catalyst to consume the remaining coke on the catalyst. This reaction regenerates the catalyst and produces the first stage regeneration gas. Through this embodiment, the catalyst is regenerated in the second stage and oxygen content is consumed in the first stage. By fully consuming the oxygen during the first stage reaction, this helps minimize secondary combustion reactions between the synthesis gas product and oxygen which produce additional carbon dioxide. In summary, the resulting product is a higher quality synthesis gas with less carbon dioxide present. Improving the quality of synthesis gas from the FCC unit helps lower the overall amount of carbon dioxide emissions from the FCC unit.

Figure 1:
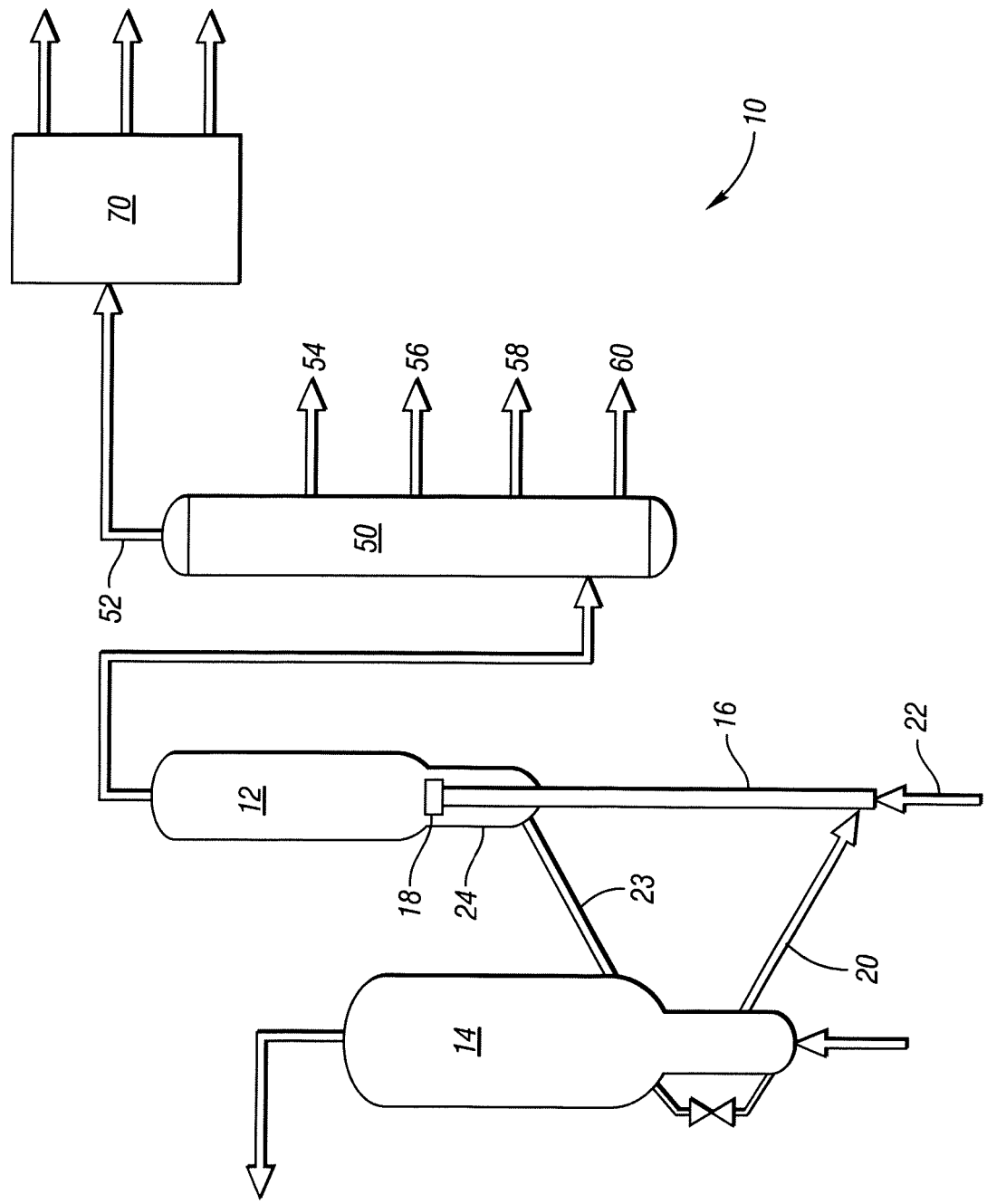
FIG. 1 is a schematic diagram of a fluid catalytic cracking unit.

FIG. 1 illustrates a fluid catalytic cracking (FCC) unit and separation system 10. As shown, the FCC unit 10 comprises a reactor 12 that is configured to receive a FCC feedstock 22 (fresh feed) and a regenerator 14 in fluid communication with the reactor 12 to receive spent catalyst. In this embodiment, the reactor 12 cracks the feedstock 22 therein to an effluent containing hydrocarbons ranging from methane through relatively high boiling point materials along with hydrogen and hydrogen sulfide. During the cracking reaction, a carbonaceous by-product is deposited on the circulating catalyst. This material, termed "coke," is continuously burned off the spent catalyst in the regenerator 14.

The FCC unit 10 comprises the regenerator 14 for regenerating spent catalyst from the reactor 12. In this embodiment, the regenerator 14 is configured to receive an artificially created feed gas and spent catalyst from the reactor 12. A preferred embodiment includes recycling CO2 from a synthesis gas separation unit (not shown) plus oxygen from an oxygen generation unit (not shown). From the reactor 12, the spent catalyst has coke deposited thereon, reducing the activity of the catalyst. The regenerator 14 receives the feed gas to burn the coke off the spent catalyst, thereby producing a synthesis gas that exits a synthesis gas line to a synthesis-gas system. To produce high quality synthesis gas, the feed gas to the regenerator preferably comprises oxygen and (1) steam, (2) carbon dioxide, or (3) steam and carbon dioxide. The synthesis gas may comprise carbon monoxide, hydrogen, carbon dioxide, steam, carbonyl sulfide, and hydrogen sulfide. The regenerator 14 is preferably configured to rejuvenate or reactivate the spent catalyst by burning the deposited coke off the spent catalyst with the feed gas at predetermined temperatures that is at a relatively high temperature.

The regenerator 14 reactivates the catalyst so that, when returned to the reactor 12, the catalyst is in optimum condition to perform its cracking function. The regenerator 14 serves to gasify the coke from the catalyst particles and, at the same time, impart sensible heat to the circulating catalyst. The energy carried by the hot regenerated catalyst is preferably used to satisfy the thermal requirements for the reactor 12 of the FCC unit 10.

It is noted that the FCC unit 10 may have a number of optional uses associated with the synthesis gas system. The synthesis gas exits the regenerator 14 at a high temperature, approximately 600 to 800° C. (1100 to 1500° F.), and at pressures of approximately 1.3 to 3.4 atmospheres (20 to 50 pounds per square inch gauge (psig)). One use for the synthesis gas could be as an energy source to drive a turboexpander-generator system for electrical power generation. Another optional use for the synthesis gas would be to convert the carbon monoxide in the synthesis gas to $CO_2$ through combustion in a CO boiler and produce high-pressure steam.

Referring to FIG. 1, from the regenerator 14, hot regenerated catalyst is preferably fed back to the reactor 12 via a reactivated catalyst return line 20. The regenerated catalyst vaporizes the hydrocarbon feedstock 22 to define resultant vapors. The resultant vapors carry the catalyst upward through a riser 16 of the reactor 12 with a minimum of back mixing. At the top of the riser 16, desired cracking reactions have been completed and the spent catalyst is relatively quickly separated from the hydrocarbon product to minimize secondary reactions. The catalyst-hydrocarbon mixture from the riser is discharged into the reactor vessel through a separation device 18, e.g., a riser termination device, achieving a substantial degree of initial catalyst-gas separation, e.g., at least 90 weight percent hydrocarbon product separation from catalyst.

The reactor effluent is preferably directed to a main fractionator or fractionation column 50 (discussed in greater detail below) of the unit 10 for resolution into gaseous light olefin co-products, FCC gasoline, and cycle stocks. The spent catalyst drops from within the reactor vessel into a stripper section 24 thereof, where a countercurrent flow of stripping gas removes trapped hydrocarbon, defining stripped spent catalyst. Stripped spent catalyst descends through a standpipe 23 and into the regenerator 14.

To maintain the activity of the working-catalyst inventory at a desired level and to make up for any catalyst lost from the system with the synthesis gas, fresh catalyst may be introduced into the circulating-catalyst system by any suitable manner. For example, this may be accomplished by way of a catalyst storage hopper (not shown). Moreover, an additional storage hopper (not shown) may be used to hold spent catalyst withdrawn from the circulating system as necessary to maintain the desired working activity and to hold all catalyst inventory when the FCC unit 10 is shut down for maintenance and repairs.

As shown in FIG. 1, in the operation of the FCC unit 10, fresh feedstock 22 and (depending on product-distribution objectives) recycled cycle oils are introduced into the bottom of the riser 16 together with a controlled amount of regenerated catalyst. The charge may be preheated, either by heat exchange or, for some applications, by means of a fired heater.

Feedstocks for the FCC process include mixtures of hydrocarbons of various types, including relatively small molecules such as found in gasoline to large molecules of 60 or more carbon atoms. The feedstock may include a relatively small content of contaminant materials such as organic sulfur, nitrogen compounds, and organometallic compounds. It is noted that the relative proportions of all such materials will vary with the geographic origin of the crude and the particular boiling range of the FCC feedstock. The feedstocks may be ranked in terms of their "crackabilities," or the ease with which they can be converted in an FCC unit. Crackability may be defined by a function of the relative proportions of paraffinic, naphthenic, and aromatic species in the feed.

The FCC unit 10 further includes a main-fractionation column 50 through which the reactor effluent is separated into various products. The main-fractionation comprises an overhead line 52, a first side cut line 54, a second side line 56, a third side cut line 58, and a bottom line 60. As shown, the overhead line 52 includes gasoline and lighter material. The overhead line 52 typically has an initial boiling point in the $C_5$ range and an end boiling point, or cut point, in the range of 150-205° C. (300-400° F.), preferably around 193° C. (380° F.). The first side cut line 54 includes naphtha, typically having a lower cut point between 120-193° C. (250-380° F.) and an upper cut point around 193-250° C. (380-480° F.), preferably around 215° C. (420° F.). The second side cut line 56 includes light cycle oil, typically having a boiling point range between 230° C. and 370° C. (450° F. and 700° F.). The third side cut line 58 includes heavy cycle oil, typically having a boiling point range between 260° C. and 370° C. (500° F. and 700° F.). Finally, the bottom line 60 includes slurry oil or clarified oil, typically with a boiling range that extends as high as the end point of the initial feed stock to the reactor (i.e. approximately 510-565° C. (950-1050° F.)). It is noted that the lines may include other products without falling beyond the scope or spirit of the present invention.

Reactor-product vapors are directed to the main fractionator 50 at which gasoline and gaseous olefin-rich co-products are taken overhead and routed to a gas-concentration unit 70. At the main-fractionator 50, light-cycle oil is recovered as a side cut with the net yield of this material being stripped for removal of light ends and sent to storage. Net column bottoms are yielded as slurry or clarified oil. Because of the high efficiency of the catalyst-hydrocarbon separation system utilized in the reactor design, catalyst carry-over to the fractionator 50 is minimized and it is not necessary to clarify the net heavy product yielded from the bottom of the fractionator 50 unless the material is to be used in some specific application requiring low solids content such as the production of carbon black. In some instances, heavy material can be recycled to the base of reactor riser 16 to be combined with fresh feed.

Maximum usage is made of the heat available at the main column 50. Typically, light-cycle and heavy-cycle oils are utilized in the gas-concentration section 70 for heat-exchange purposes, and steam is generated by circulating the main-column bottoms stream.

In this embodiment, the FCC unit 10 further includes the gas-concentration column 70 or an "unsaturated gas plant" in fluid communication with the overhead line 52 of the main-fractionation column 50. From the overhead line 52, the gas-concentration column 70 receives unstable gasoline and lighter products that are separated therethrough into fuel gas for alkylation, polymerization, and debutanized gasoline.

The gas-concentration section 70, or unsaturated-gas plant, may be one or an assembly of absorbers and fractionators that separate the main-column overhead into gasoline and other desired light products. Olefinic gases from other processes such as coking may be also sent to the FCC gas-concentration section. The gas-concentration unit may have one or a plurality of columns. For example, the gas-concentration unit may be a "our-column" gas-concentration plant comprising a primary absorber, a secondary absorber, a stripper, and a debutanizer. In this embodiment, gas from the FCC main-column overhead receiver is compressed and directed to the gas-concentration unit.

Figure 2:
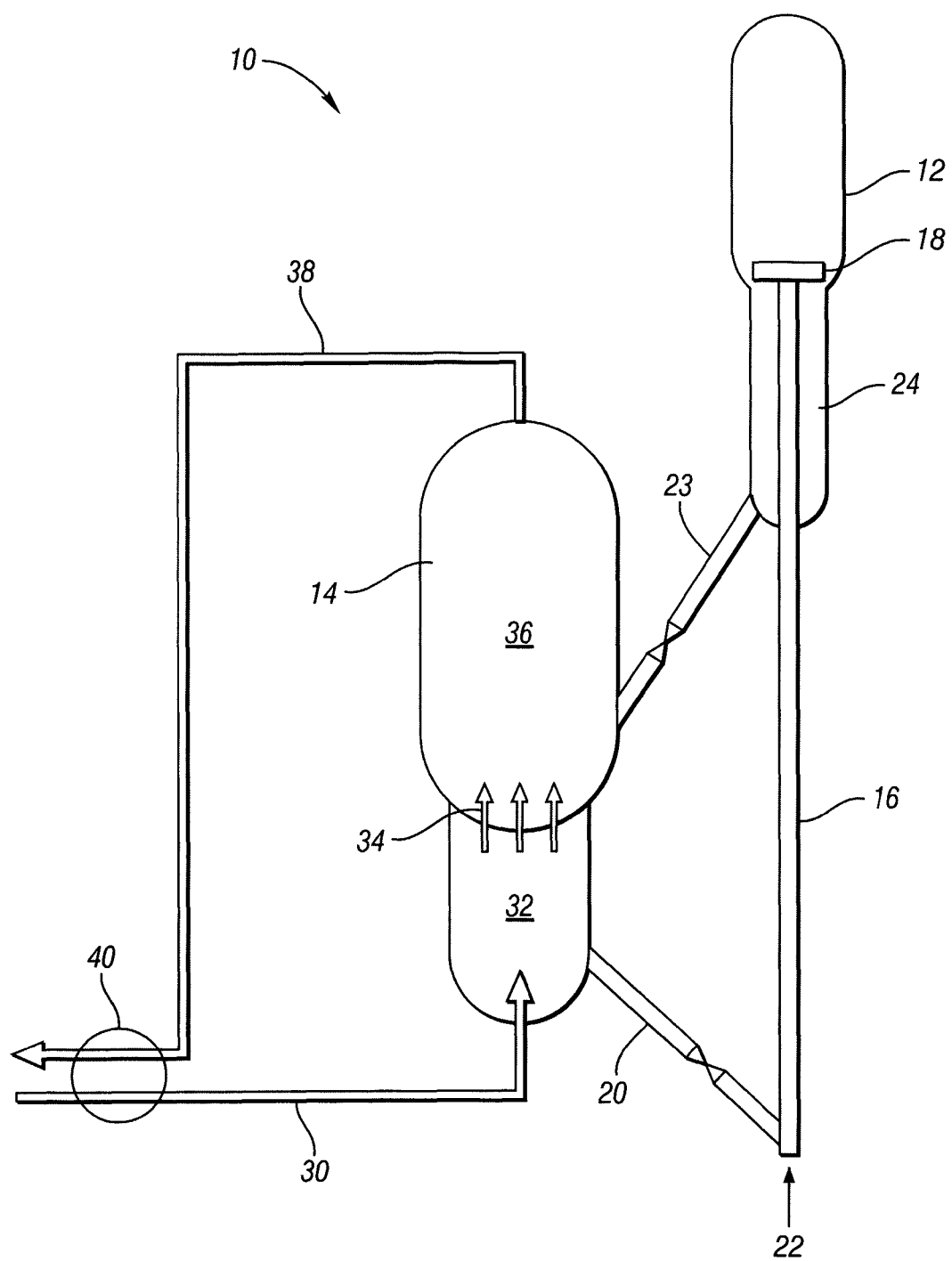
FIG. 2 is a schematic diagram of a reactor and a regenerator with first and second stages, and first and second stage regeneration gases.

One embodiment of the present invention, shown in FIG. 2, implements the regeneration of catalyst and production of a higher quality synthesis gas through a regenerator with first and second stages. The process begins when spent catalyst is transferred to the regenerator 14 from the reactor 12 through a standpipe 23. The spent catalyst enters the first stage 36 of the regenerator 14. A first stage regeneration gas 34 is provided to react with the spent catalyst and remove a portion of the coke from the spent catalyst. Preferably, the first stage regeneration gas 34 passes over the catalyst in a counter-current manner. The reaction and removal of some of the coke creates a partially regenerated catalyst that moves from the first stage 36 to the second stage 32 of the regenerator 14 for complete coke removal. Preferably, a majority of the coke is removed from the spent catalyst in the first stage 36. The reaction in the first stage 36 also creates a synthesis gas 38 product that leaves the top of the regenerator 14.

In the second stage 32 of the regenerator 14, the partially regenerated catalyst is reacted with a second stage regeneration gas 30. This reaction produces a regenerated catalyst that flows through a catalyst return line 20 where it contacted with the feedstock 22 for the cracking reaction in the riser 16. The reaction in the second stage 32 also creates a product gas, otherwise defined as the first stage regeneration gas 34 that exits the top of the second stage 32.

Regarding the second stage regeneration gas 30, it is preferred that the second stage regeneration gas 30 and partially regenerated catalyst move counter-currently from each other. Operating with counter-current gas flow allows the second stage 32 to achieve conditions of excess oxygen and full combustion while controlling the overall oxygen input to the regenerator 14. In one embodiment, the oxygen containing gas enters near the bottom of the second stage 32, reacts with the remaining coke on the partially regenerated catalyst, and exits near the top of the second stage 32 (to enter the first stage 36). The oxygen content can be monitored at both entrance and exit of the second stage 32. Monitoring the exit stream (i.e. the first stage regeneration gas 34) for oxygen will show whether all of the partially regenerated catalyst has been regenerated. If oxygen is present, then the catalyst has been fully regenerated. If too much oxygen is present in the exit stream, this may lead to unwanted synthesis gas combustion in the first stage 36, if all of the coke is removed from the spent catalyst in the first stage. Therefore, monitoring and controlling the input oxygen content in the second stage regeneration gas 30 while monitoring the oxygen content leaving the second stage 32 and entering the first stage 36 is important to control how much spent catalyst is partially oxidized in the first stage 36.

The embodiment in FIG. 2 is designed to completely regenerate the spent catalyst and send the regenerated catalyst back to the reactor with a negligible amount of coke. At the same time, the embodiment is designed to maximize the quality of the synthesis gas 38 leaving the regenerator 14. Through this two-stage regenerator, complete regeneration and maximized synthesis gas quality are possible.

Producing a high quality synthesis gas 38 begins with a feed gas to the regenerator 14, which in FIG. 2 is defined as the second stage regeneration gas 30. The second stage regeneration gas 30 comprises oxygen. It preferably further comprises (1) steam, (2) carbon dioxide, or (3) steam and carbon dioxide. The second stage regeneration gas 30 also preferably does not include nitrogen. In other words, this embodiment comprises a feed gas, or second stage regeneration gas 30, that does not inject air into the regenerator. Instead, the injected gas is an artificially created mixture comprising (1) oxygen and steam, (2) oxygen and carbon dioxide or (3) oxygen, steam, and carbon dioxide. Concentration levels for these three main components can range from 0 to 50 mol % for oxygen (preferably around 25 to 30 mol %), 0 to 75 mol % for carbon dioxide, and 0 to 75 mol % for steam. Preferably, the second stage regeneration gas is around 30 mol % oxygen and 70 mol % carbon dioxide on a dry basis. There may be some amount of water vapor present, depending on the source of the carbon dioxide.

Additionally, using an artificially created feed gas to the regenerator 14 (the second stage regeneration gas 30 in FIG. 2) allows for additional advantages within the scope of this invention. For one embodiment, the oxygen concentration can be altered significantly. As mentioned previously, the oxygen content preferably ranges from 0 to 50 mol %, and more preferably ranges between 25 and 30 mol %. And just as the oxygen content can vary, so can the flowrate of catalyst or the flowrate of gas through the regenerator 14. Varying gas flow or mass flow can in-turn control the temperature of the regenerated catalyst returning to the reactor for cracking.

A preferred embodiment in FIG. 2 is that the second stage regeneration gas 30 has enough oxygen content to remove the remaining coke from the partially regenerated catalyst. In other words, it is preferred that the second stage 32 be configured for oxidation conditions. One goal of the embodiment is to send a regenerated catalyst to the reactor 12 with negligible levels of coke on the catalyst. Additionally, excess oxygen is ideal in the second stage regeneration gas 30 as it becomes part of the product gas, or the first stage regeneration gas 34. This gas moves from the second stage 32 to the first stage 36 of the regenerator 14.

Preferable operating temperatures of the second stage 32 of the regenerator 14 are approximately between 675 and 735° C. (1250 and 1350° F.). Preferable operating pressures of the second stage 32 of the regenerator 14 are approximately between 1.7 and 3.4 atmospheres (25 and 50 psig). It should be noted that having higher levels of oxygen in the second stage regeneration gas 30 may require the regenerator to be composed of expensive metallurgy based on the temperature delta created by the reaction of coke and oxygen.

As discussed, the second stage regeneration gas 30 reacts with the partially regenerated catalyst to produce the first stage regeneration gas 34. This intermediate synthesis gas is created by reacting oxygen with coke in the presence of steam and/or carbon dioxide. This intermediate synthesis gas, or first stage regeneration gas 34, may comprise at least one of carbon monoxide, hydrogen, carbon dioxide, steam, carbonyl sulfide, and hydrogen sulfide. Additionally, the first stage regeneration gas 34 includes the remaining unreacted oxygen from the second stage regeneration gas 30 that was not used to burn coke in the second stage 32.

The first stage regeneration gas 34, containing oxygen, reacts with the spent catalyst entering the first stage 36 of the regenerator 14 from the reactor 12. An embodiment of the invention is for the oxygen content of the first stage regeneration gas 34 to be consumed in the first stage 36 of the regenerator 14. The goal is to have a partial regeneration, and not a complete regeneration, of the catalyst in the first stage 36. In other words, it is preferred that the first stage 36 be configured for gasification-like conditions. Under this embodiment, the first stage 36 of the regenerator 14 has spent catalyst entering with coke that has yet to be oxidized. In addition, the first stage regeneration gas 34 is oxygen deficient. There is not enough oxygen in the first stage 36 to oxidize all of the coke from the spent catalyst. The synthesis gas 38 produced from the first stage 36 reaction will have no remaining oxygen. Excess oxygen at high temperatures may lead to combustion with the synthesis gas 38 to produce unwanted carbon dioxide. This embodiment limits synthesis gas combustion reactions that may take place between the synthesis gas and oxygen. These reactions are limited because the first stage regeneration gas 34 enters the first stage 36 oxygen deficient.

Preferable operating temperatures of the first stage 36 of the regenerator 14 are approximately between 705 and 815° C. (1300 and 1500° F.). Preferable operating pressures of the second stage 32 of the regenerator 14 are approximately between 1.36 and 3.40 atmospheres (20 and 50 psig).

An additional embodiment, included in FIG. 2, is the presence of a heat exchanger 40. The goal is to pre-heat the incoming second stage regeneration gas 30 to the second stage 32. One method of pre-heating the second stage regeneration gas 30 is to heat exchange the gas with the synthesis gas 38 exiting the regenerator. This is possible since the synthesis gas 38 may be as hot as 980°C. (1800° F.). Pre-heating the second stage regeneration gas 30 can assist in producing a quality synthesis gas. Additionally, pre-heating the gas provides heat to the regenerated catalyst leaving through the catalyst return line 20 for the reaction between the regenerated catalyst and FCC feedstock 22 in the riser 16. Therefore, it is preferred to pre-heat the second stage regenerator gas 30 to at least 425° C. (800° F.). It is more preferred to pre-heat the second stage regenerator gas 30 to at least 537° C. (1000° F.).

Producing a higher quality of synthesis gas in the regenerator 14 is beneficial in the goal of reducing the amount of carbon dioxide emitted from refinery operations. Higher quality synthesis gas has a lesser amount of carbon dioxide emitted. Additionally, hydrogen and carbon monoxide in the synthesis gas can be used as fuel sources for other refinery units. In particular, hydrogen production from the FCC regenerator can reduce or eliminate the need for a hydrogen furnace, and all the fuel burned therein. With other refinery units no longer having to produce and burn these fuel sources, the carbon dioxide emissions from these units decline. Additionally, the carbon dioxide being produced in the regenerator 14 is generally "clean" and capable of being sequestered by an amine absorber more readily than carbon dioxide emissions within other units in the refinery. In other words, it is possible that producing more synthesis gas in the FCC unit 10 can reduce the amount of carbon dioxide emissions in the overall refinery.

While the present invention has been described in terms of preferred embodiments, it will be understood, of course, that the invention is not limited thereto since modifications may be made to those skilled in the art, particularly in light of the foregoing teachings.

What is claimed is:

1. A method of regenerating catalyst in a fluidized catalytic cracking unit having a reactor and a regenerator with first and second stages and first and second stage regeneration gases, the method comprising:
    reacting the first stage regeneration gas comprising oxygen with spent catalyst from the reactor in the first stage of the regenerator to consume the oxygen in the first stage regeneration gas defining partially regenerated catalyst and a synthesis gas; and
    reacting the second stage regeneration gas comprising oxygen with the partially regenerated catalyst in the second stage of the regenerator to regenerate the partially regenerated catalyst and to form the first stage regeneration gas for reaction with the spent catalyst in the first stage of the regenerator, thereby completing regeneration of a catalyst while improving the quality of synthesis gas from the regenerator.

2. A method of claim 1 wherein the first stage regeneration gas passes counter-currently over the spent catalyst in the first stage of the regenerator;
    and the first stage regeneration gas enters the first stage of the regenerator from the second stage of the regenerator.

3. A method of claim 1 wherein the partially regenerated catalyst enters the second stage of the regenerator from the first stage of the regenerator; the second stage regeneration gas passes counter-currently over the partially regenerated catalyst in the second stage of the regenerator; and the first stage regeneration gas created from the reaction in the second stage of the regenerator passes into the first stage of the regenerator.

4. A method of claim 1 wherein the second stage regeneration gas further comprises an additional gas composition selected from the group consisting of: (a) carbon dioxide, (b) steam, and (c) carbon dioxide and steam.

5. A method of claim 1 wherein the second stage regeneration gas comprises oxygen, carbon dioxide, steam, and the absence of nitrogen.

6. A method of claim 5 wherein:
    the concentration of oxygen is between 0 and 50 mol %, preferably between 25 and 30 mol %;
    the concentration of carbon dioxide is between 0 and 75 mol %, preferably between 70 and 75 mol %; and
    the concentration of steam is between 0 and 75 mol %.

7. A method of claim 1 wherein the temperature of the second stage of the regenerator is between 675 and 735 degrees Celsius.

8. A method of claim 1 wherein the pressure of the second stage of the regenerator is between 25 and 50 psig.

9. A method of claim 1 wherein the temperature of the first stage of the regenerator is between 705 and 815 degrees Celsius.

10. A method of claim 1 wherein the pressure of the first stage of the regenerator is between 20 and 50 psig.

11. A method of claim 1 wherein the synthesis gas leaving the first stage of the regenerator is used to pre-heat the second stage regeneration gas to the second stage of the regenerator.

12. A method of claim 11 wherein the second stage regeneration gas is pre-heated to at least 425 degrees Celsius, preferably at least 537 degrees Celsius.

13. A method of regenerating catalyst in a fluidized catalytic cracking unit having a reactor and a regenerator with first and second stages and first and second stage regeneration gases, the method comprising:
    reacting the first stage regeneration gas comprising oxygen with spent catalyst from the reactor in the first stage of the regenerator to consume the oxygen in the first stage regeneration gas defining partially regenerated catalyst and a synthesis gas, wherein the first stage regeneration gas passes counter-currently over the spent catalyst; and
    reacting the second stage regeneration gas comprising oxygen with the partially regenerated catalyst in the second stage of the regenerator to regenerate the partially regenerated catalyst and to form the first stage regeneration gas for reaction with the spent catalyst in the first stage of the regenerator, wherein the second stage regeneration gas passes counter-currently over the partially regenerated catalyst, thereby completing regeneration of a catalyst while improving the quality of synthesis gas from the regenerator.

* * * * *